United States Patent
Miyaoh et al.

(10) Patent No.: US 6,619,665 B2
(45) Date of Patent: Sep. 16, 2003

(54) CYLINDER HEAD GASKET WITH PARTIAL RESIN COATINGS

(75) Inventors: Yoshio Miyaoh, Tokyo (JP); Noriaki Akimoto, Tokyo (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 0 days.

(21) Appl. No.: 09/921,632

(22) Filed: Aug. 6, 2001

(65) Prior Publication Data

US 2002/0020970 A1 Feb. 21, 2002

(30) Foreign Application Priority Data

Aug. 7, 2000 (JP) .................................... 2000-238767

(51) Int. Cl.7 ................................................ F02F 11/00
(52) U.S. Cl. .................... 277/592; 277/591; 277/593; 277/594; 277/595
(58) Field of Search ................... 277/591–601

(56) References Cited

U.S. PATENT DOCUMENTS

| | | | | |
|---|---|---|---|---|
| 368,189 A | * | 8/1887 | Carter | 277/611 |
| 3,930,656 A | * | 1/1976 | Jelinek | 277/611 |
| 4,397,472 A | * | 8/1983 | Czernik | 277/592 |
| 4,898,396 A | * | 2/1990 | Udagawa | 277/592 |
| 5,150,910 A | * | 9/1992 | Udagawa | 277/592 |
| 5,205,566 A | * | 4/1993 | Ueta et al. | 277/596 |
| 5,280,928 A | * | 1/1994 | Ueta et al. | 277/595 |
| 5,286,039 A | * | 2/1994 | Kawaguchi et al. | 277/593 |
| 5,431,418 A | * | 7/1995 | Hagiwara et al. | 277/592 |
| 5,472,217 A | * | 12/1995 | Hagiwara et al. | 277/596 |
| 5,582,415 A | * | 12/1996 | Yoshida et al. | 277/592 |
| 5,664,790 A | * | 9/1997 | Tanaka et al. | 277/595 |
| 5,695,203 A | | 12/1997 | Udagawa | |
| 6,053,503 A | * | 4/2000 | Buck et al. | 277/592 |
| 6,056,296 A | * | 5/2000 | Ii | 277/595 |
| 6,145,847 A | * | 11/2000 | Maeda et al. | 277/593 |
| 6,180,167 B1 | * | 1/2001 | Majewski et al. | 427/198 |
| 6,457,726 B1 | * | 10/2002 | Jung | 277/611 |
| 6,517,085 B2 | * | 2/2003 | Udagawa et al. | 277/592 |
| 2001/0048202 A1 | * | 12/2001 | Zerfab et al. | 277/592 |
| 2002/0014745 A1 | * | 2/2002 | Miyaoh et al. | 277/592 |

* cited by examiner

*Primary Examiner*—Lynne H. Browne
*Assistant Examiner*—Lisa Bannapradist
(74) *Attorney, Agent, or Firm*—Kanesaka & Takeuchi

(57) ABSTRACT

A cylinder head gasket for an internal combustion engine is formed by a first metal plate extending substantially throughout an entire area to be sealed and having a first hole corresponding to a hole of the engine, and second and third metal plates disposed to sandwich the first plate and having second and third holes formed in the respective second and third plates corresponding to the first hole. First and second beads are formed in the respective second and third plates to extend toward the first metal plate. A first resin coating is deposited on at least one side of the first metal plate at an inner portion relative to the first bead, and a second resin coating is deposited on at least one side of the first metal plate at an outer portion relative to the first bead without extending over an entire surface thereof. The second resin coating has a thickness at most equal to that of the first resin coating. The surface pressure around the hole can be adjusted precisely.

6 Claims, 3 Drawing Sheets

CYLINDER HEAD GASKET WITH PARTIAL RESIN COATINGS

BACKGROUND OF THE INVENTION AND RELATED ART STATEMENT

The present invention relates to a cylinder head gasket formed of at least three metal plates, and in particular, the cylinder head gasket is provided with partial resin coatings around a hole to be sealed.

A cylinder head gasket for sealing between a cylinder head and a cylinder block is generally formed of one or a plurality of metal plates, and includes holes for cylinder bores, oil holes, water holes, and bolt holes. Also, in order to seal combustion gases generated in the combustion chambers, oil circulating through an oil gallery and water in a water jacket, the gasket includes sealing means, such as beads and seal rings, for providing adequate sealing pressures for the respective holes to be sealed.

Especially, since high temperature and high pressure combustion gases are generated around the holes for the cylinder bores when the engine is operated, sealing around the holes for the cylinder bores is especially important. Therefore, the metal plate superior in mechanical strength and durability is used, and sealing means for forming main sealing portions are arranged around the holes for the cylinder bores to form seal lines.

The sealing means may be a full bead or half bead, or a combination thereof, which is arranged in various ways. Further, the surface pressure of the bead may be changed, and in order to protect the bead from creep relaxation, a stopper bead may be formed or metal shim may be laminated on a plate.

However, in the cylinder head gasket, the cylinder head and the cylinder block are formed of relatively soft aluminum alloy in order to make the weight of the engine light. Therefore, if the surface pressure of the bead is high, the cylinder block and cylinder head may be damaged when a force due to engine vibration and heat expansion is applied thereto. The combustion gas may leak through the damaged portion.

On the contrary, if the sealing surface pressure is insufficient, the combustion gas enters the oil hole and water hole to cause air inclusion, which also causes a trouble in circulation of oil and water.

It is, therefore, important to provide a sufficient sealing ability and to set a sealing surface pressure in order not to cause damage to the engine parts sandwiching the head gasket. Since the best sealing surface pressure which is determined by the contradictory demands is within a narrow range, it is required to have a structure of the cylinder head gasket such that the sealing surface pressure which is formed by processing is adjusted and set to generate a desired sealing surface pressure.

Conventionally, the adjustment of the sealing surface pressure, which is determined by the material of the metal plate or shape of the bead formed by the press, is made by a stopper, such as an auxiliary bead or metal shim. However, since the auxiliary bead is formed by press, accuracy is not great. Also, in view of the thickness and the material of the shim to be able to processing, the precise adjustment is difficult by the shim.

The present invention has been made to obviate these problems, and an object of the invention is to provide a cylinder head gasket, wherein a sealing surface pressure of a bead can be adjusted precisely to thereby set a best sealing surface pressure.

Another object of the invention is to provide a cylinder head gasket as stated above, wherein engine parts to which the gasket is installed are not damaged.

A further object of the invention is to provide a cylinder head gasket as stated above, wherein creep relaxation of the bead is prevented.

Further objects and advantages of the invention will be apparent from the following description of the invention.

SUMMARY OF THE INVENTION

A cylinder head gasket for an internal combustion engine of the invention basically comprises a first metal plate extending substantially throughout an entire area to be sealed and having a first hole corresponding to a hole of the engine, and second and third metal plates disposed to sandwich the first plate. The second and third metal plates include second and third holes formed therein corresponding to the first hole, and first and second beads formed in the respective second and third plates and extending toward the first metal plate. The gasket further includes a first resin coating deposited on at least one side of the first metal plate at an inner portion relative to the first bead, and a second resin coating deposited on at least one side of the first metal plate at an outer portion relative to the first bead without extending over an entire surface thereof. The second resin coating has a thickness at most equal to that of the first resin coating.

In the cylinder head gasket, since concave portions of the beads are directed to the engine parts, such as a cylinder head and a cylinder block, the sealing surface pressure at the beads is less than a case where top portions of the beads are directed to the engine parts. Thus, the applied force generated at the engine parts becomes small, so that the damages at the surfaces of the engine parts are not formed.

Also, the resin coatings which are arranged on both sides of the bead to form step coatings are softer than a metal shim, and the thickness thereof can be precisely made easily. Also, since the resin coatings are harder than a rubber coating, the resin coatings do not flow or break. Thus, precisely adjustment of the sealing surface pressure around the cylinder bore can be made easily by the adjustment of the thicknesses of the step coatings.

Since the step coatings do not flow or break, seal lines are formed at the step portions of the step coatings. Accordingly, the sealing ability is improved. Also, if the pressure applied to the bead is increased, the pressure is partly supported on both sides of the bead. Thus, flattening and creep relaxation of the bead are prevented.

In the gasket of the invention, the first resin coating and/or the second resin coating may be extended to be located within the width of the bead. In this structure, the resin step coatings are located within the width of the bead, and when the bead is compressed, one side of the resin coating near the top of the bead contacts, at first, a side of the bead to supplementarily support the bead. Thus, the sealing surface pressure may be increased slightly, as compared to a case where the step coating is formed outside the width of the bead.

Also, the maximum sealing surface pressure becomes greater as the step coatings extend close to the center of the width of the bead. Thus, the maximum sealing surface pressure can be adjusted precisely by not only the thicknesses of the step coatings but also the positions of the ends of the coatings at the sides of the beads.

Incidentally, if a metal shim or a thermally sprayed shim is used, it is impossible to adjust the thickness less than 30 μm. Also, the processing for covering the side portions of the bead can not be made easily, so that the processing accuracy is bad and the processing cost increases.

In the gasket of the invention, the first and second resin coatings have the hardness of F to 6H in pencil hardness. If the resin coating is softer than F in pencil hardness, for example the coating is made of a rubber coating softer than the resin coating, the resin coating may flow or break by pressure and can not provide a step. Also, adjustment of the surface pressure can not be made, and since the step is not maintained, the seal lines can not be formed on both sides of the bead. If the resin layer is harder than 6H in pencil hardness, the sealing and absorbing abilities become bad. Therefore, the resin layer is formed to have the hardness of F to 6H in pencil hardness.

In the gasket of the invention, the first and second resin coatings may be formed of epoxy resin, phenol resin, phenoxy resin, fluoroplastics and polyamideimide, or combination thereof. Although the resin coatings may be formed of various resins, it is preferable to use epoxy resin, phenol resin, phenoxy resin, fluoroplastics and polyamideimide, or combination thereof in view of the hardness and easiness of the application. Especially, the phenoxy resin has heat resistance over 200° C., and in view of the working ability and physical characteristics in coating, it is most preferable to use the phenoxy resin.

In the invention, the first and second resin coatings are applied by screen printing. Although the resin coatings may be formed by spraying using a mask, the resin coatings can be easily formed even in a complicated shape if the screen printing is used. Further, by multiple printings, the thickness of the resin coating can be easily changed. Thus, it is possible to easily form the resin coatings with adequate thickness according to the position thereof. In the multiple printing, the step resin coatings can be made with various shapes and thicknesses, and multiple structure with different materials can be made easily.

The gasket of the invention may have additional coatings, such as gum coatings on the entire surfaces of the gasket, in addition to the resin coatings explained above.

DETAILED DESCRIPTION OF PREFERRED EMBODIMENTS

Now, the specific embodiments of the invention will be explained with reference to the drawings.

Figure 1:
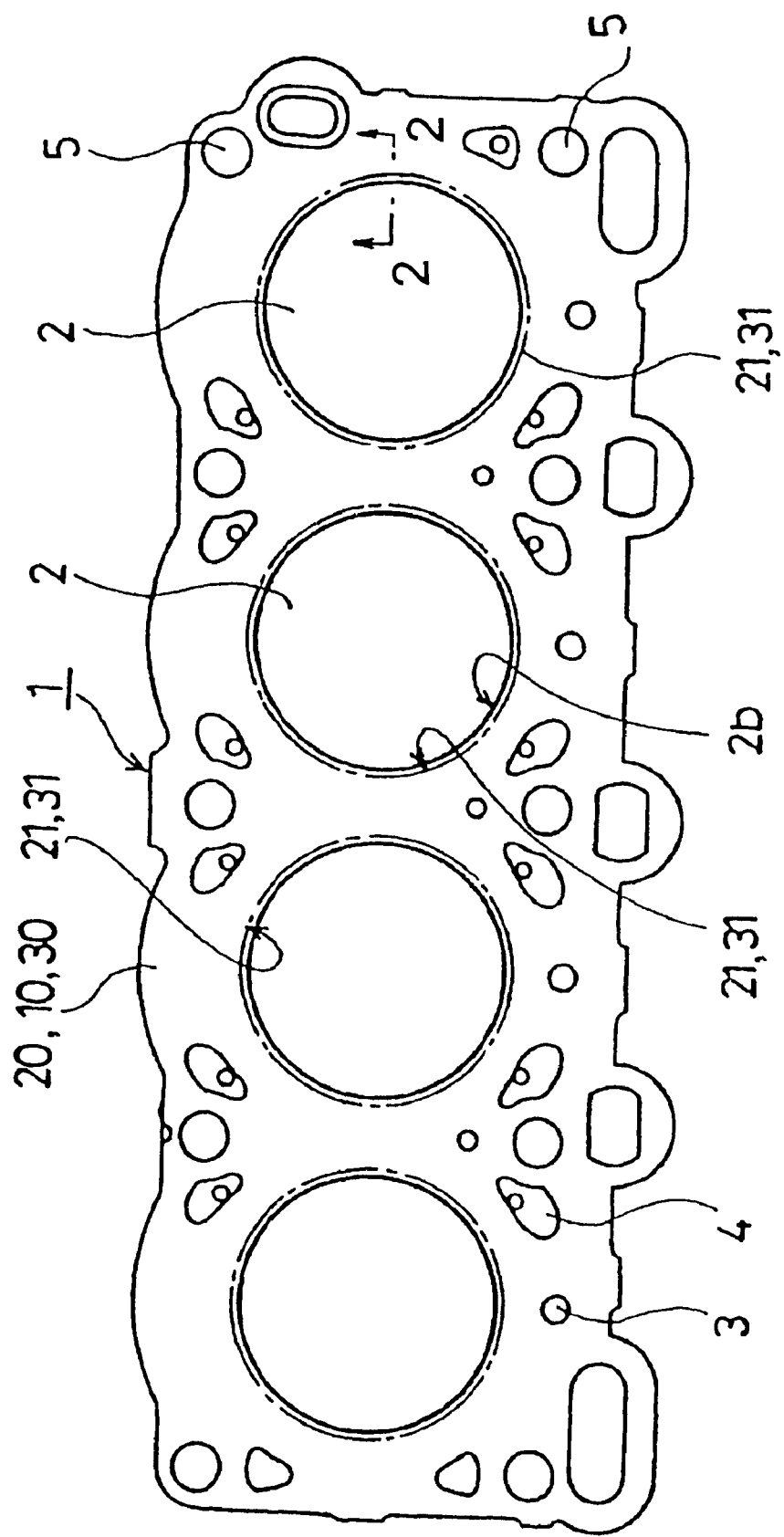
FIG. 1 is a plan view of a first embodiment of a cylinder head gasket of the invention.
Figure 2:
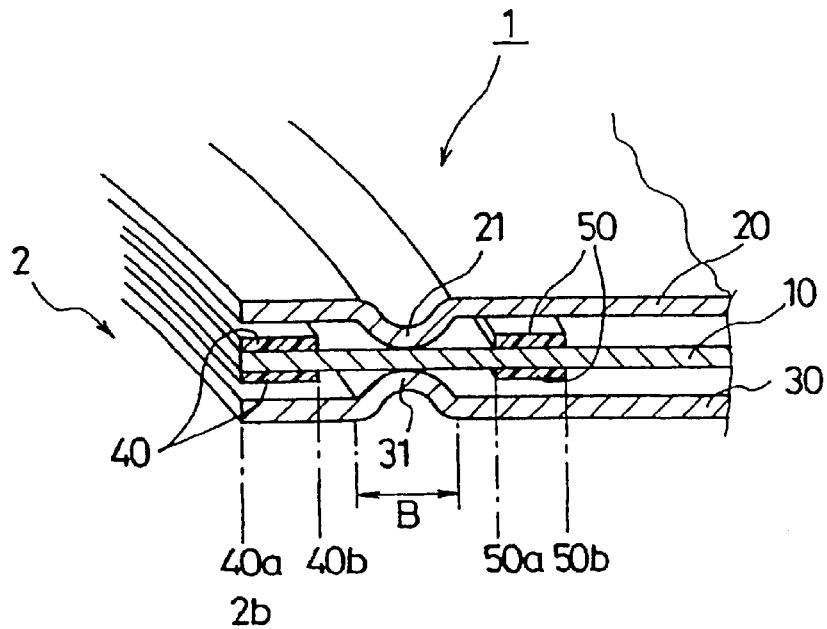
FIG. 2 is an enlarged perspective sectional view taken along line 2—2 in FIG. 1.

As shown in FIGS. 1 and 2, a cylinder head gasket 1 is designed to seal between a cylinder head and a cylinder block (both not shown), and is structured by three metal plates, i.e. first to third metal plates, 10, 20, 30, which are made of metal plates superior in mechanical strength and durability. The gasket 1 includes holes 2 for cylinder bores, oil holes 3, water holes 4, bolt holes 5 and so on.

As the materials for the metal plates 10, 20, 30, hard metal, such as soft steel plate, stainless steel plate and spring plate, or ductile metal, such as copper and aluminum plates, may be used.

In order to seal around the holes 2 for the cylinder bores, as shown in FIG. 2, beads 21, 31 are formed on the metal plates 20, 30 for sandwiching the metal plate 10 entirely around the peripheries 2b of the holes 2 for the cylinder bores such that the top portions of the beads 21, 31 face each other through the metal plate 10.

On both surfaces of the metal plate 10, step coatings 40, 50 made of resin are formed annularly. Namely, the first step coatings 40 are formed inside the beads 21, 31, while the second step coatings 50 are formed outside the beads 21, 31.

In the first embodiment as shown in FIG. 2, the first step coatings 40 are formed such that inner ends 40a are located at the same positions as the ends 2b of the hole 2 for the cylinder bore, and outer ends 40b are located outside the beads 21, 31. Namely, the first step coatings 40 are not located in the width range B of the beads 21, 31.

Also, the second step coatings 50 are formed such that inner ends 50a are located outside the beads 21, 31, i.e. not located in the width range B of the beads 21, 31, and outer ends 50b are located at positions determined by the easiness of the coating processing and ranges capable of forming the step seal lines.

The step coatings 40, 50 are formed of epoxy resin, phenol resin, phenoxy resin, fluoroplastics or polyamideimide, or a combination thereof, which is applied by screen printing. The step coating has a hardness of F-6H in pencil hardness such that when the coating is compressed, the coating is deformed but not broken or damaged. In view of the working ability and physical characteristics of the coating, phenoxy resin may be preferably used.

The first step coating 40 may have the thickness same as or greater than that of the second step coating 50. As an example, although the size of the gasket depends on the size of the engine, the thickness of each of the first to third metal plates 10, 20, 30 is 150–500 μm; the diameter of each hole 2 for the cylinder bore is 80 mm; the height of each of the beads 21, 31 before compression is 150–400 μm and the width B is 600–1,000 μm; the thickness of the first and second step coatings 40, 50 is 5–150 μm; the width of the first step coating (40a–40b) is 20–150 μm; and the width of the second step coating (50a–50b) is 10–100 μm.

In order to seal oil circulating through the oil gallery and water in the water jacket, sealing means, such as full bead or half bead, for forming appropriate sealing pressure may be formed around the oil holes 3 and water holes 4.

Also, as required, after forming the step coatings 40, 50, a surface coating may be applied on the entire surfaces of the gasket 1. As the surface coating, it is preferable to have good durability and heatproof property relative to the combustion gas and liquid, i.e. oil and water, to be sealed, and also have softness and recovery ability for the compressing deformation. The material may be a rubber type material, such as NBR gum, fluorine rubber, silicone rubber, hydrogen added nitrilebutadiene rubber.

In case the rubber type material is used, since the material has resiliency, a tool mark and so on formed on the cylinder head and the cylinder block can be absorbed.

According to the first embodiment of the cylinder head gasket 1, since the concave portions of the beads 21, 31 are directed to the sides abutting against the engine parts, such as cylinder head and cylinder block, the sealing surface pressures are small as compared to the projecting sides of the beads, and the forces formed on the engine parts can be made small. Therefore, the formation of the damage on the surface of the engine part is reduced.

Further, since the step coatings 40, 50 formed of a resin, which is softer than a metal shim, can be adjusted precisely in thickness, is harder than a rubber coating and does not flow or break, are arranged on both sides of the beads 21, 31, the sealing surface pressure can be adjusted precisely by adjusting the thicknesses of the step coatings 40, 50.

Also, since the first and second step coatings 40, 50 do not flow or break, it is possible to improve the sealing ability by forming the seal lines at the ends of the steps of the step coatings 40, 50. Also, when the compression force applied to the beads 21, 31 is increased, the compressing force is partly supported at both sides of the bead by the step coatings 40, 50, so that the flattening and creep relaxation of the beads 21, 31 are prevented.

Figure 3:
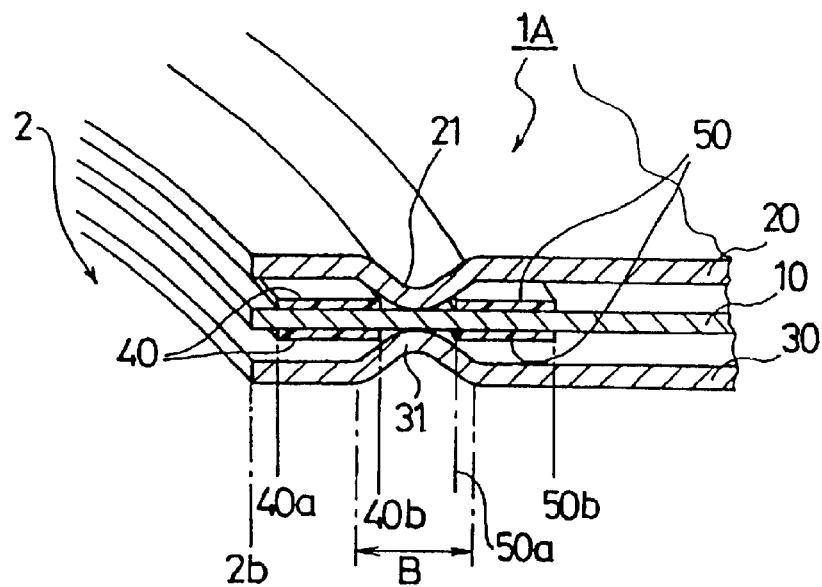
FIG. 3 is a perspective sectional view, similar to FIG. 2, of a second embodiment of the invention.
Figure 4A:
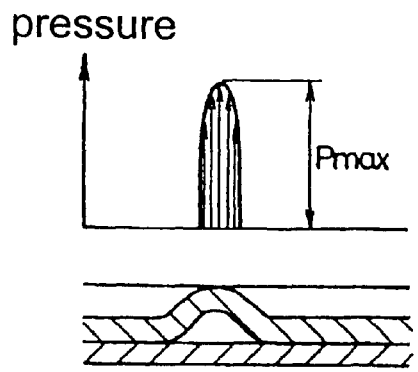
FIG. 4(a) is an explanatory view showing a sealing surface pressure where a projecting portion of a bead abuts against a portion.
Figure 4B:
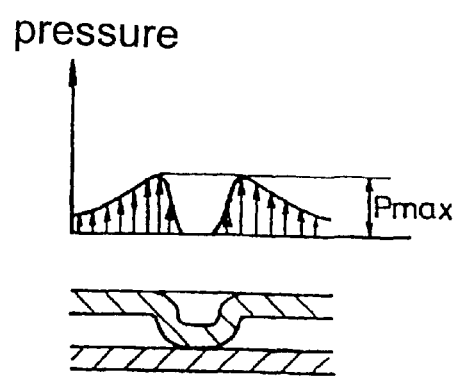
FIG. 4(b) is an explanatory view showing a sealing surface pressure where a concave portion of a bead abuts against a portion.

The head gasket 1A of a second embodiment of the invention is formed, as shown in FIG. 3, such that the first step coating 40 and the second step coating 50 are located or projected into the range of the width B of the beads 21, 31. Namely, the outer ends 40b of the first step coating 40 and the inner ends 50a of the second step coatings 50 are located within the width B of the beads 21, 31.

In the head gasket 1A with this structure, since the ends 40b, 50a of the first and second step coatings 40, 50 formed of the resin are located within the width B of the bead, when the beads 21, 31 are compressed, the ends 40b, 50a of the step coatings first abut against the side portions of the beads 21, 31 to support the beads 21, 31. Thus, the sealing surface pressure can be slightly increased as compared to the structure where the first and second step coatings 40, 50 are formed outside the width B of the bead.

Figure 5A:
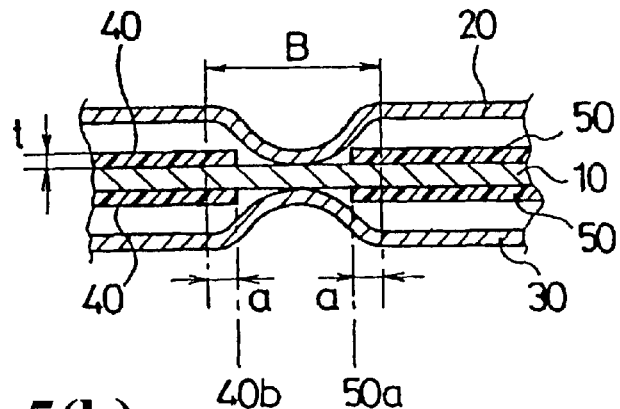
FIG. 5(a) is a partial sectional view of a gasket of the invention showing a thickness and an end position of a resin coating.
Figure 5B:
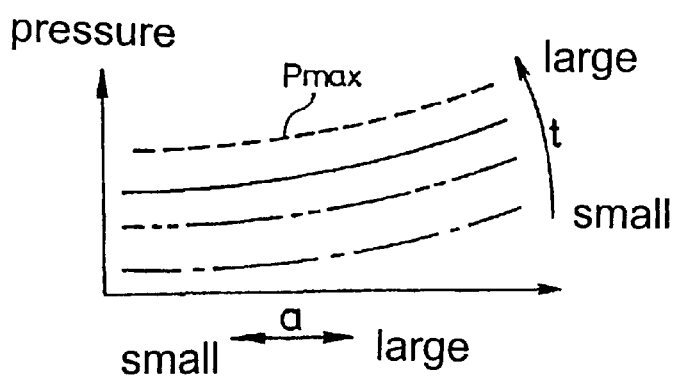
FIG. 5(b) is a graph showing a relation among a maximum sealing surface pressure, and a thickness and an end position of the resin coating.

As shown in FIG. 5(b), the amount of sealing surface pressure Pmax gradually increases as the first and second step coatings 40, 50 extend toward the center of the width B of the bead, i.e. top of the bead. Therefore, it is possible to adjust the sealing surface pressure Pmax by the locations of the ends 40b, 50a of the step coatings 40, 50 independent of the thicknesses of the step coatings 40, 50.

The thickness t of the step coatings 40, 50 is determined with reference to the strength of the beads 21, 31 relative to the required seal surface pressure Pmax and the coatings. Also, the small adjustment of the seal surface pressure Pmax can be made by the locations a of the ends 40b, 50a of the step coatings 40, 50 extending to the center of the width B of the bead.

The thickness of the first step coating 40 is formed as in or greater than that of the second step coating 50. The step coatings need not have the equal thickness, and may be changed in the thickness, as required. Also, the step coatings 40, 50 may partly have multiple layers, so that the sealing surface pressure may be changed in each hole to be sealed or a specific part of the bead surrounding a hole to be sealed.

In regard to the ends of the step coatings 40, 50, the inner end 40a of the first step coating may be aligned with the end 2b of the hole 2 for the cylinder bore, or outside the end 2b. In case of forming multiple layers, an end of an upper resin layer may be aligned with an end of a lower resin layer, or located stepwisely.

The widths, locations and thicknesses of the step coatings 40, 50 are determined by the surface pressure distribution required by the respective head gasket. In case the beads 21, 31 of the second and third metal plates 20, 30 and the first and second step coatings 40, 50 are arranged symmetrically relative to the center or first metal plate 10, the design of the surface pressure, pressing and printing processing can be made easily, so that the gasket can be manufactured at a low cost. However, the invention is not limited to the above structure, and the beads and other structures may be arranged asymmetrically relative to the first metal plate 10.

Also, the first and second step coatings 40, 50 made of the resin can be formed easily by screen printing or spraying using a mask. Thus, the management of the material and processing can be easily made, so that the increase of the manufacturing steps and the cost is made small.

Since the resin layer has the hardness of F-6H in pencil hardness, the resin layer does not flow nor break. Thus, it is possible to establish the sealing ability and absorbing property.

In the present invention, the sealing surface pressure around the hole to be sealed can be adjusted precisely.

While the invention has been explained with reference to the specific embodiments of the invention, the explanation is illustrative, and the invention is limited only by the appended claims.

What is claimed is:

1. A cylinder head gasket for an internal combustion engine having a hole to be sealed, comprising:

a first metal plate extending substantially throughout an entire area to be sealed and having a first hole corresponding to the hole of the engine, second and third metal plates disposed to sandwich the first plate and having second and third holes formed in the respective second and third plates corresponding to the first hole, and first and second beads formed in the respective second and third plates and extending toward the first metal plate, each of said first and second beads having a top portion contacting the first plate and two side portions sandwiching the top portion, first resin coatings deposited symmetrically on two sides of the first metal plate at inner portions relative to the first and second beads, and having ends at sides close to the first and second beads, and second resin coatings deposited symmetrically on the two sides of the first metal plate at outer portions relative to the first and second beads without extending over entire surfaces thereof, said second resin coatings having a thickness at most equal to that of the first resin coatings and ends at sides close to the first and second beads, said first and second resin coatings being formed on the first plate to partly overlap the first and second beads to be able to contact the two side portions without contacting the top portions so that when the first and second beads are compressed, the ends of the first and second resin coatings abut against the side portions of the first and second beads to support the first and second beads.

2. A cylinder head gasket according to claim 1, wherein said first and second resin coatings have a hardness of F to 6H in pencil hardness.

3. A cylinder head gasket according to claim 1, wherein said first and second resin coatings have heatproof and compressibility characteristics to securely seal the first plate with respect to the second and third plates.

4. A cylinder head gasket according to claim 1, wherein said first and second resin coatings are selected from the group consisting of epoxy resin, phenol resin, phenoxy resin, fluoroplastics and polyamideimide.

5. A cylinder head gasket according to claim 1, wherein one of the first coatings and one of the second coatings formed on a same side of the first metal plate is spaced apart from each other for a width less than a width of one of the first and second beads, respectively.

6. A cylinder head gasket according to claim 5, wherein said first and second beads are arranged symmetrically relative to the first plate.

* * * * *